United States Patent [19]

Pomeroy

[11] 4,390,903

[45] Jun. 28, 1983

[54] IMAGING SYSTEM AND METHOD WITH MID-TONE ENHANCEMENT

[75] Inventor: Keith H. Pomeroy, San Juan Capistrano, Calif.

[73] Assignee: American Hoechst Corporation, Somerville, N.J.

[21] Appl. No.: 143,814

[22] Filed: Apr. 23, 1980

[51] Int. Cl.³ .............................................. H04N 1/40
[52] U.S. Cl. ................................... 358/282; 358/199; 358/293; 358/284; 358/285
[58] Field of Search ............... 358/293, 280, 285, 199, 358/298, 283, 284, 282, 212, 166; 346/108; 250/205, 578

[56] References Cited

U.S. PATENT DOCUMENTS

| | | | |
|---|---|---|---|
| 2,956,115 | 10/1960 | Hefele | 358/260 |
| 3,465,352 | 9/1969 | Carlson | 358/285 |
| 3,479,453 | 11/1969 | Townsend | 358/284 |
| 3,484,791 | 12/1969 | Saeger et al. | 358/300 |
| 4,002,829 | 1/1977 | Hutchison | 358/286 |
| 4,122,409 | 10/1978 | Marlett et al. | 346/108 |

Primary Examiner—Jin F. Ng
Assistant Examiner—Edward L. Coles
Attorney, Agent, or Firm—Flehr, Hohbach, Test, Albritton & Herbert

[57] ABSTRACT

Laser imaging system and method in which mid-tones are enhanced to eliminate undesired growth in halftone and text images. The pulses which control the modulation of the writing beam are each decreased in width by a fixed amount to provide the desired mid-tone enhancement.

10 Claims, 3 Drawing Figures

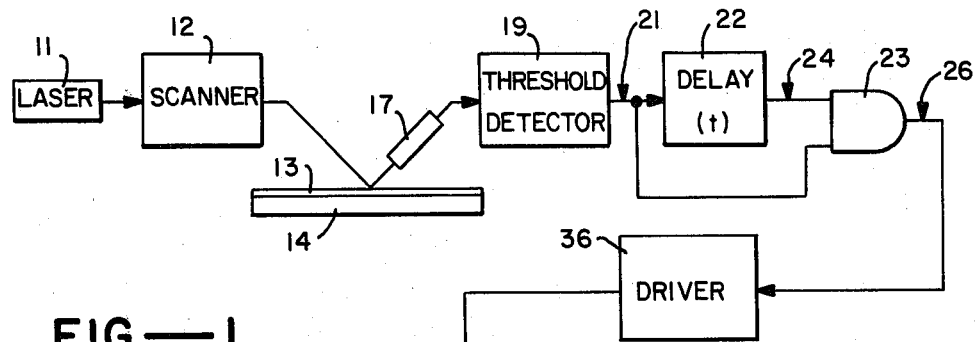
FIG.—1
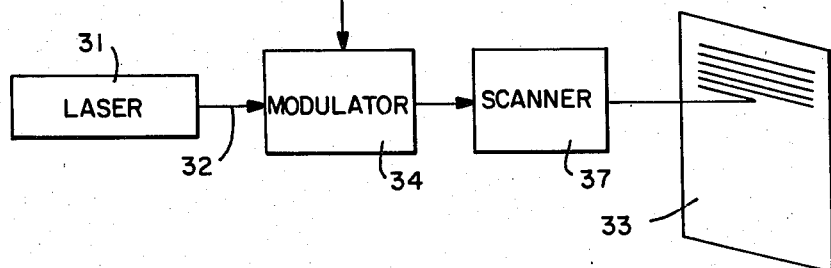
FIG.—2
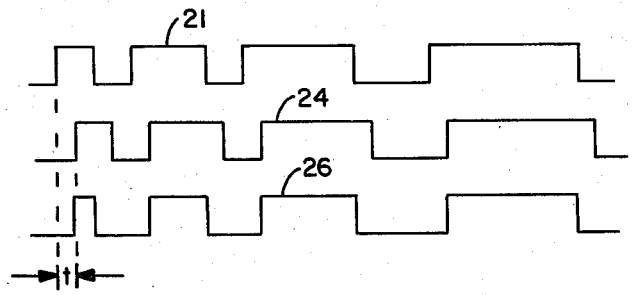
FIG.—3

IMAGING SYSTEM AND METHOD WITH MID-TONE ENHANCEMENT

BACKGROUND OF THE INVENTION

1. Field of the Invention

This invention pertains generally to imaging systems and methods and more particularly to a laser engraving system and method in which an image of an object is formed on an output medium by a scanning laser beam.

2. Description of the Prior Art

Images formed by a scanning laser beam have a tendency to grow in the direction of beam travel. This inability to reproduce images from a paste-up on a 1:1 dimensional basis at the necessary exposure level has created significant problems, such as a muddiness or lack of contrast in halftone images reproduced by this method and growth in size of the text images. Because of this growth, it is generally necessary to employ a relatively high threshold setting in order to keep halftone shadows open. When the threshold is set high enough for this purpose, a characteristic breaking occurs in the top and bottom portions of letters such as C, O, and S.

In the past, there have been attempts to overcome the problem of imaging growth by techniques such as the use of special amplifiers and astigmatic optics, underexposure of the image, and the use of high gamma plates and strong developers. Utilizing such techniques, it is sometimes possible to reproduce images with the desired 1:1 relationship. However, these techniques are not suitable for use on anything but an individual basis.

It has also generally been necessary to expose halftones at a different camera setting than is normally used, and any type reproduced with the halftones shows growth for positively exposed plates and shrinkage for negatively exposed film systems.

OBJECTS AND SUMMARY OF THE INVENTION

It is in general an object of the invention to provide a new and improved laser imaging system and method which overcome the problems of growth encountered with laser systems of the prior art.

Another object of the invention is to provide a system and method of the above character in which the elimination of growth is inexpensive to implement.

These and other objects are achieved in accordance with the invention by decreasing by a fixed amount each pulse which is employed to turn on the writing beam as it scans across the output medium. This uniform decrease in pulse width eliminates the growth in the mid-tone range, e.g. 30–70% screen density.

BRIEF DESCRIPTION OF THE DRAWINGS

FIG. 1 is a simplified block diagram of one embodiment of a laser imaging system incorporating the invention.

FIG. 2 is a waveform diagram illustrating the operation of a portion of the system of FIG. 1.

FIG. 3 is a graphical representation illustrating the problem of image growth which is overcome by the invention.

DESCRIPTION OF THE PREFERRED EMBODIMENT

As illustrated in FIG. 1, the imaging system comprises a laser 11 which produces a reading beam 12 for scanning a paste-up 13 or other input copy on a copyboard 14. A scanner 16 deflects the reading beam so that it scans the input copy on a line by line basis in raster fashion.

A fiber optic array 17 is positioned for receiving light reflected by the copy from the reading beam and delivering this light to a photomultiplier tube which provides an electrical signal corresponding to the information read from the input copy. The fiber optic array comprises a plurality of fiber optic strands arranged in a straight line at one end generally parallel to the scan lines of the reading beam. The other ends of the fibers are drawn together so that the light from the entire width of the copy is delivered to the photomultiplier tube.

The video signal produced by the photomultiplier varies in a generally sinusoidal fashion in accordance with the information scanned from the input copy. The level of this signal is monitored by a threshold detector 19 which, in effect, converts the sinusoidally varying video signal to a generally rectangular signal. The output signal from the threshold detector is illustrated as waveform 21 in FIG. 2 and comprises a series of generally rectangular pulses of uniform height and a width which varies with the video signal. Thus, when the video signal is above the level set by the threshold detector, output signal 21 is high, and when the input signal is below the threshold level, the output signal is low.

It has been observed that the amount of growth which occurs in the mid-tone range, e.g. about 30–70% screen density, of a laser scanning system is relatively constant. Thus, for example, a 4 mil dot grows to 5.5 mils, an 8 mil dot grows to 9.5 mils, a 15 mils dot grows to 16.5 mils, and so on. In order to eliminate this growth, means is provided for decreasing each one of the pulses in output signal 21 from the threshold detector by a fixed amount. This means includes a delay network 22 and an AND gate 23. The signal from the threshold detector is applied to the input of the delay network and to one input of the AND gate. The output of the delay network is connected to the second input of the AND gate. The delay network is chosen to provide a time delay t corresponding to the amount to be removed from each pulse in waveform 21. As illustrated by waveform 24 in FIG. 2, the signal at the output of the delay network is similar to the threshold detector signal but delayed by time t. The output signal from AND gate 23 is illustrated as waveform 26 in FIG. 2 and is the logical AND function of waveforms 21 and 24. It will be noted that waveform 26 is similar to waveform 21, with a fixed amount removed from the leading edge of each positive pulse in the waveform.

In one presently preferred embodiment, the scanner operates at a speed of 350 scans per second, and the effective input copy format is 21,000 mils wide. With these parameters, 1 mil is scanned in 136 nanoseconds, and a delay of 205 nanoseconds provides a reduction of 1.5 mils per pulse in the output image.

The imaging system also includes a second laser 31 which provides a writing beam 32 for scanning an output medium 33 such as a printing plate or film. A modulator 34 controls the intensity of the writing beam at the output medium in accordance with the output signal of AND gate 23. This signal is applied to the control input of the modulator by a driver 36. A scanner 37 deflects the modulated writing beam so that it scans along successive lines on the output medium in raster fashion. In the system illustrated, the input copy and the output medium are scanned simultaneously, and rather than using separate scanners for the two beams, a single scanner can be employed for both beams. In a facsimile system where the reading and writing systems are located at different stations and do not scan simultaneously, separate scanners are employed.

Operation and use of the system of FIG. 1, and therein the method of the invention can now be described. As the input copy is scanned by the reading beam, the video signal from the photomultiplier tube associated with fiber optic array 17 is converted to a rectangular pulse signal 21 by threshold detector 19. Delay network 22 and AND gate 23 remove a fixed amount from each pulse in waveform 21, as discussed above and illustrated in FIG. 2. To form the desired image on a printing plate, modulator 34 turns the writing beam on when the output signal from AND gate 23 is high. When the output medium is a film, the output of the threshold detector 19 is inverted, and the writing beam is on when the output of AND gate 23 is high to form a negative image. In either case, the reduced pulse width prevents undesired growth in the output image.

In FIG. 3, a first curve 39 illustrates the relationship between the relative sizes of dots and holes at the input copy and the output medium without the invention. In this example, the threshold detector is set for a minimum dot size of 4 mils, and dots ranging from about 6 mils–16 mils in the input image produce dots approximately 1.5 mils larger in the output image. Conversely, a reduction of about 1.5 mils occurs for holes ranging in size from about 6 mils to 16 mils in the input image.

Curve 41 illustrates the effect on the invention in eliminating dot growth and hole shrinkage. As illustrated by this curve, a 1:1 relationship is provided for dots and holes ranging in diameter from about 6 mils to 16 mils. There is still a tendency for a small amount of dot growth in a direction across the line of scan, but the reduction in dot size along the scan line is sufficient to change the i integration (area) effect and bring the contrast back to the 1:1 relationship expected from a camera exposure. There is also a corresponding reduction in the size of the text in the reproduction, and the result is clearly to bring the laser scanned system into line with the camera system.

The invention has a number of important features and advantages. It effectively eliminates the image growth and related problems which have existed in laser imaging systems of the prior art. The mid-tone enhancement technique is inexpensive to implement, requiring only a simple delay network and a single AND gate in the embodiment illustrated.

It is apparent from the foregoing that a new and improved laser imaging system and method have been provided. While only certain presently preferred embodiments have been described in detail, as will be apparent to those familiar with the art, certain changes and modifications can be made without departing from the scope of the invention as defined by the following claim.

I claim:

1. In a method for forming an image of an object on an output medium, the steps of: scanning the object to provide a video signal which varies in level in accordance with the object, processing the video signal to provide a generally rectangular signal comprising a series of pulses of predetermined height and a width which varies in accordance with the level of the video signal, decreasing the width of each one of the pulses by a predetermined fixed amount, scanning a writing beam across the output medium and modulating the beam in accordance with the pulses of decreased width to form an image of the object on the output medium.

2. The method of claim 1 wherein the generally rectangular signal is provided by applying the video signal to a threshold detector.

3. The method of claim 1 wherein each of the pulses has a leading edge and a trailing edge, and the width of each pulse is decreased by the predetermined amount at the leading edge of the pulse.

4. In a system for forming an image of an object on an output medium: means for scanning the object to provide a video signal which varies in level in accordance with the object, means responsive to the video signal for providing a generally rectangular signal comprising a series of pulses of predetermined height and a width which varies with the level of the video signal, means for decreasing the width of each one of the pulses by a predetermined fixed amount, means for scanning a writing beam across the output medium, and means responsive to the generally rectangular signal for modulating the writing beam to form an image of the object on the output medium.

5. The system of claim 4 wherein the means for decreasing the width of the pulses comprises a delay network responsive to the generally rectangular signal for providing a delayed signal having the same waveform as the generally rectangular signal but displaced in time by an amount corresponding to the predetermined amount by which the pulse width is to be decreased, and coincidence gate means responsive to the generally rectangular signal and to the delayed signal for providing an output signal corresponding to the logical AND function of the generally rectangular signal and the delayed signal.

6. The system of claim 4 wherein the means for scanning the object comprises a laser which produces a reading beam, means for deflecting the reading beam across the object in raster fashion, and means responsive to light reflected by the object from the reading beam for providing an electrical signal which varies in accordance with the object.

7. The system of claim 6 wherein the means responsive to light reflected by the object comprises a photomultiplier tube and a fiber optic array for directing light from the object to the photomultiplier tube.

8. The system of claim 4 wherein the writing beam comprises a laser beam which is scanned across the output medium in raster fashion.

9. In a laser imaging system for forming an image of input copy on an output medium such as film or a printing plate: means for scanning the input copy with a laser beam to provide an electrical signal comprising a series of pulses which vary in width in accordance with the input copy, means for decreasing the width of each of the pulses by a predetermined fixed amount, a laser for providing a writing beam, means for scanning the writing beam across the output medium in raster fashion, and means for modulating the writing beam in accordance with the pulses of decreased width to form an image of the input copy on the output medium.

10. The system of claim 9 wherein the means for scanning the input copy comprises means for deflecting the laser beam across the copy in raster fashion, means responsive to light reflected by the copy from the beam for providing an electrical signal which varies in level in accordance with the input copy, and level responsive means for converting the electrical signal to a generally rectangular waveform.

* * * * *